United States Patent [19]
Krieg

[11] Patent Number: 4,873,902
[45] Date of Patent: Oct. 17, 1989

[54] RAILROAD RAIL COLD SAW

[76] Inventor: Adrian H. Krieg, 119 Maplevale Dr., Woodbridge, Conn. 06525

[21] Appl. No.: 180,671

[22] Filed: Apr. 7, 1988

Related U.S. Application Data

[63] Continuation of Ser. No. 851,128, Apr. 11, 1986, abandoned.

[51] Int. Cl.$^4$ .......................... B27B 5/18; B23Q 3/08; B23D 47/08
[52] U.S. Cl. ........................................ 83/745; 83/489; 30/372; 269/32
[58] Field of Search ...................... 30/372, 371; 83/745, 83/489; 269/32, 239, 257, 258, 265, 268, 156

[56] References Cited

U.S. PATENT DOCUMENTS

| | | | |
|---|---|---|---|
| 462,293 | 11/1891 | Beauregard et al. | 83/745 |
| 898,413 | 9/1908 | Merralls | 269/32 X |
| 1,151,340 | 8/1915 | Butz et el. | 83/745 |
| 1,297,112 | 3/1919 | Dayton | 269/32 X |
| 1,348,616 | 8/1920 | Zimmerman | 83/745 |
| 1,418,644 | 6/1922 | Hawley | 30/371 |
| 1,586,314 | 5/1926 | Kiefer | 269/156 |
| 1,868,739 | 7/1932 | Everett | 83/745 X |
| 2,487,022 | 11/1949 | LaPlaca | 269/268 X |
| 3,027,155 | 3/1962 | Paterson | 269/32 |
| 3,028,170 | 4/1962 | Norrick | 269/265 X |
| 4,183,512 | 1/1980 | Goff et al. | 269/239 X |
| 4,203,582 | 5/1980 | Hart et al. | 269/32 |
| 4,484,775 | 11/1984 | Norkus | 269/239 |

*Primary Examiner*—Frank T. Yost
*Assistant Examiner*—Michael D. Folkerts
*Attorney, Agent, or Firm*—Cobrin, Feingertz & Gittes

[57] ABSTRACT

A railroad rail cold sawing device for securement about a railroad rail having a central web and flanges connected to opposite ends of the web, includes a sawing section having a sawing blade; a drive section; a spline drive shaft for removably connecting the drive section and the sawing section to cause rotation of the saw blade; and at least one clamping assembly for removably clamping the sawing section and the drive section to the railroad rail, each clamping assembly including a support for supporting a respective section on an upper one of the flanges, a fixed clamping leg fixedly secured to the support for clamping one side of the central web, a pivotal clamping leg pivotally secured to the support for clamping an opposite side of the central web, and a piston-cylinder drive assembly connected to the support and the pivoting clamping leg for pivoting the pivoting clamping leg into clamping relation with the opposite side of the central web to secure the respective section to the railroad rail.

8 Claims, 4 Drawing Sheets

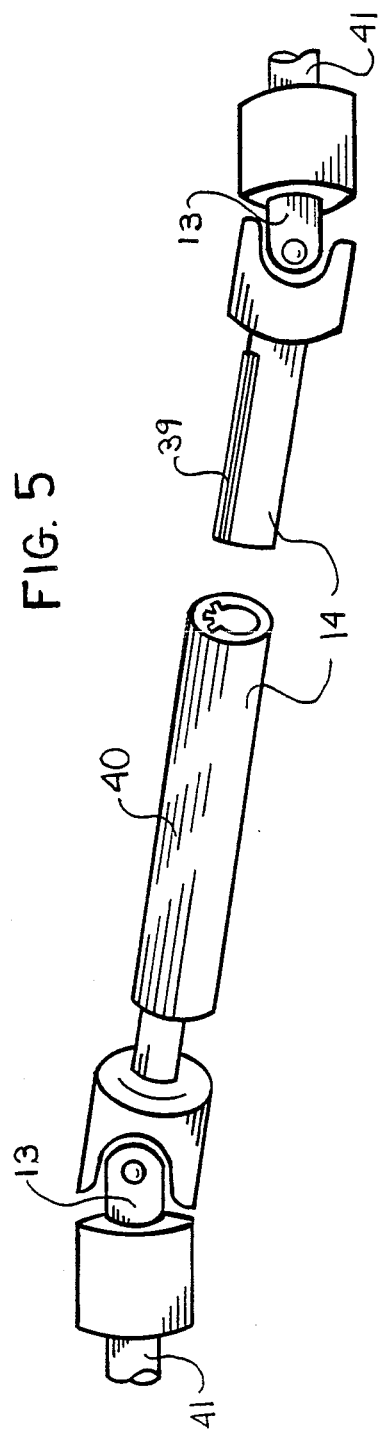

RAILROAD RAIL COLD SAW

This is a continuation of application Ser. No. 06/851,128 filed 4/11/86, now abandoned.

BACKGROUND OF THE INVENTION

This invention relates generally to sawing devices, and more particularly, is directed to a device for cutting railroad rails in place, in the field or in the shop.

Previously, the cutting of railroad rails has been accomplished by the method of oxy-fuel cutting, that is, through the use of acetylene, natural gas, or other fuel and oxygen mixtures. There are numerous disadvantages of oxy-fuel cutting of railroad rails, such as heat distortion of the rail, poor accuracy of the cut (due to inconsistent cut width), poor quality of the cut (due to irregular surface), inability to weld the rail (due to the quality of the cut), the necessity to clean up by grinding the end of the cut for preparation for the weld or for bolting onto another section of the rail.

Another known method of cutting a railroad rail is by means of abrasive cutting machines, that is, abrasive cut-off grinders utilizing silicon carbide cut-off wheels, driven by high horsepower motors. However, there are also numerous disadvantages of abrasive machining for the cutting of railroad rails. First and foremost is the high cost of cut-off wheels. Another disadvantage is the speed of rotation of such wheels at approximately 16,000 surface feet per minute, requiring extensive reinforcing of the cut-off wheel. Abrasive machining also develops considerable heat and thus, heat distortion of the rail occurs. Most railroad rails are of a high tensile alloy steel that is designed specifically to be abrasion resistant, and for this reason, has a tendency to glaze when abrasive machining is utilized, thus leading to the very rapid wear of grinding wheels. In both abrasive and oxy-fuel cutting methods, there are also inherent dangers to the operator.

In the 1980s, the use of welded railroad rails have become very pronounced, and it is anticipated that this process will grow in the coming years. In the future, all rails will be cut with cold machining as described with respect to the present invention.

An electrical carrier utilized by some urban transportation systems, such as Bart, San Francisco, and the like, is a new type of third rail system. This third rail system is a steel I-section which has aluminum fused to the web on both sides. This type of rail cannot be cut efficiently by either the oxy-fuel cutting method or the abrasive method because of the melting point variation between aluminum and steel. Cold saws can cut such composite material without difficulty.

OBJECTS AND SUMMARY OF THE INVENTION

Accordingly, it is an object of the present invention to provide a device for cutting railroad rails in place, in the field or in the shop.

It is another object of the present invention to provide a device for cutting railroad rails that is portable, and which uses existing an rail structure as a machine frame.

It is another object of the present invention to provide a device for cutting railroad rails that can be separated into two sections so as to be easily handled by an operator.

It is another object of the present invention to provide a device for cutting railroad rails that guarantees a true and accurate cut at an exact 90 degree angle to the rail every time.

It is another object of the present invention to provide a device for cutting railroad rails that is safe for the operator to use.

It is another object of the present invention to provide a device for cutting railroad rails that produces good quality preparation for a welded joint.

It is another object of the present invention to provide a device for cutting railroad rails that is cleaner than other known devices.

It is another object of the present invention to provide a device for cutting railroad rails that cuts the rails without producing any burrs.

In accordance with an aspect of the present invention, a clamping assembly is provided for clamping a railroad rail cold sawing device about a railroad rail having a central web and flanges connected to opposite ends of the web, the clamping assembly including support means for supporting a respective section of the device on an upper one of the flanges; fixed clamping leg means fixedly secured to the support means for clamping one side of the central web; pivotal clamping leg means pivotally secured to the support means for clamping an opposite side of the central web; and drive means connected to the support means and the pivoting clamping leg means for pivoting the pivoting clamping leg means into clamping relation with the opposite side of the central web to secure the respective section to the railroad rail.

In accordance with another aspect of the present invention, a railroad rail cold sawing device is provided for securement about a railroad rail having a central web and flanges connected to opposite ends of the web, the device including a sawing section having a sawing blade; a drive section; connection means for removably connecting the drive section and the sawing section to cause rotation of the saw blade; and clamping means for removably clamping the sawing section and the drive section to the railroad rail.

In accordance with still another aspect of the present invention, a railroad rail cold sawing device is provided for securement about a railroad rail having a central web and flanges connected to opposite ends of the web, the device including a sawing section having a sawing blade; a drive section; connection means for removably connecting the drive section and the sawing section to cause rotation of the saw blade; and clamping means for removably clamping the sawing section and the drive section to the railroad rail, the clamping means including support means for supporting a respective section on an upper one of the flanges, fixed clamping leg means fixedly secured to the support means for clamping one side of the central web, pivotal clamping leg means pivotally secured to the support means for clamping an opposite side of the central web, and drive means connected to the support means and the pivoting clamping leg means for pivoting the pivoting clamping leg means into clamping relation with the opposite side of the central web to secure the respective section to the railroad rail.

The above and other objects, features and advantages of the present invention will become readily apparent from the following detailed description which is to be read in connection with the accompanying drawings.

BRIEF DESCRIPTION OF THE DRAWINGS

FIG. 5 is a perspective view of the drive shaft that connects the rotary drive system to the saw section.

DETAILED DESCRIPTION OF A PREFERRED EMBODIMENT

Figure 1:
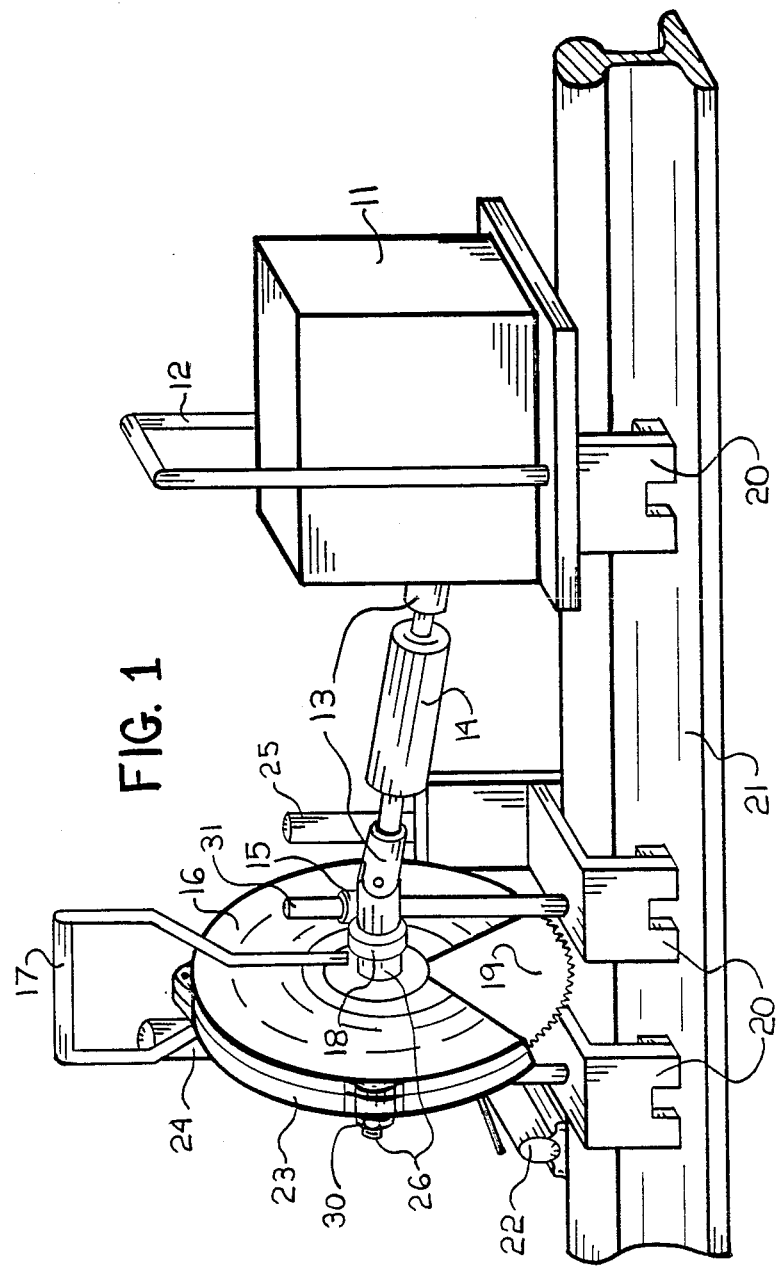
FIG. 1 is a perspective view of a railroad rail cold saw device according to the present invention, illustrating the sawing mechanism connected via a spline drive shaft to a rotary drive system mounted on a rail.

Referring to the drawings in detail, and initially to FIG. 1 thereof, there is shown an overall perspective view of a railroad rail cold saw device according to the present invention, which is mounted on a railroad rail 21 acting as a machine frame. The device is clearly separated into two distinct sections separated by a spline drive shaft 14. A rotary drive system 11 comprises one of the sections and is held to rail 21 by a clamping mechanism 20. Rotary drive system 11 includes a rotary motor. A carrying handle 12 for rotary drive system 11 is also provided, and a universal joint 13 is attached to the male end 39 (FIG. 5) of spline drive shaft 14, and to a shaft extension 41 of the rotary drive system 11, as shown in FIGS. 1 and 5.

As to the other or sawing section of the device, there is provided one set of two clamping mechanisms 20 secured to rail 21, on opposite sides of a saw blade 19, and which hold the sawing portion to railroad rail 21, the latter again acting as a machine frame. A hand pump 22 of the type commonly sold under the Trademarks "Enerpac" and "Powerteam" is provided to activate three hydraulic clamping pistons 25, only one of which is shown. Each hydraulic clamping piston 25 is used to activate a respective clamping mechanism 20 to clamp onto rail 21.

Figure 2:
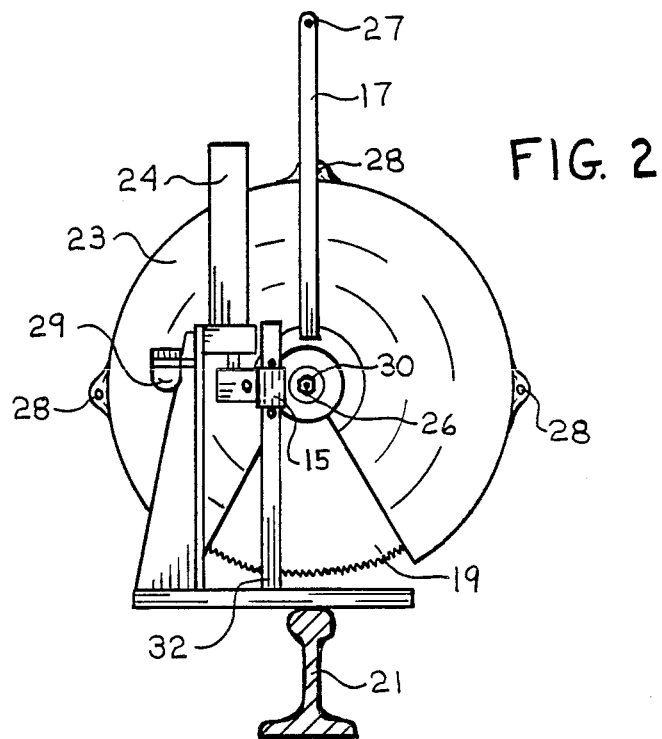
FIG. 2 is an end plan view of the device of FIG. 1, with the clamping mechanisms omitted.

The sawing section also includes a circular saw blade 19 surrounded by a cover section 16 and a removable cover section 23, except at the lower end thereof, the cover sections being connected together by cover mounting screws 28 (FIG. 2). Circular saw blade 19 operates at low speeds, and can be made of HSS tool steel, carbide inserts or segmented carbide. A carrying handle 17 is also connected to the cover sections for carrying the sawing section, as shown in FIG. 1, and is held in place by a handle screw 27 (FIG. 2). Saw blade 19 is mounted on a saw blade arbor shaft 26, which is supported by a bearing assembly on each side of saw blade 19, only right side bearing assembly 18 being shown in FIG. 1. Bearing assembly 18 is connected at its other end, via a shaft extension 41, to another universal joint 13 which is connected to the female end 40 (FIG. 5) of spline drive shaft 14. Due to the ability of male end 39 and female end 40 to remain engaged during the sawing operation, while changing position, the saw head can be moved up and down while the rotary drive system 11 remains in a fixed position. A saw blade holding nut 30 is mounted on the opposite end of saw blade arbor shaft 26, as shown in FIG. 2.

Two posts 31 are mounted in a vertical orientation on the clamping mechanisms 20 surrounding saw blade 19, each post 31 slidably supporting a linear bearing 15 thereon, so as to permit vertical motion of saw blade 19. A pistoncylinder arrangement 24 provides down feed for the cutting operation along each post 31, and in this regard, is connected to a respective linear bearing 15. Pistoncylinder arrangement 24 is smoothly and evenly activated by an accumulator 29 (FIG. 2), such as a hydraulic accumulator sold by Parker or Sperry-Vickers. Such an accumulator will provide constant uniform pressure through the entire cutting cycle.

When cutting steel, particularly unsupported material, it is important to support both sides of the cut. There are two reasons for this, namely, first, to prevent the blade from being pinched by the material, and second, to obtain a cut without a burr. The present invention foresees this by supporting the rail on both sides of the cut while utilizing the rail being cut as a frame member for the device.

Figure 3:
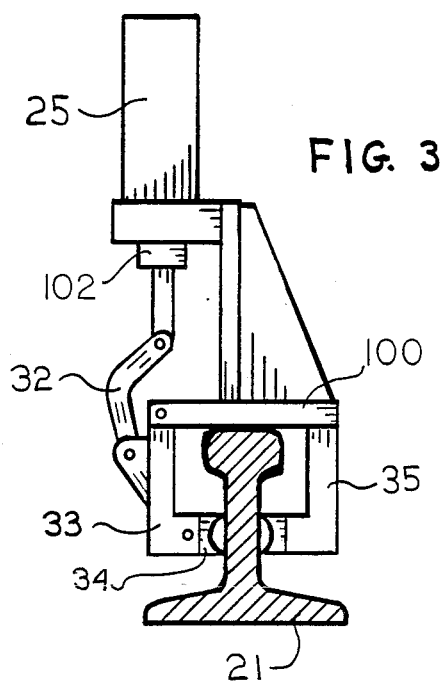
FIG. 3 is an end plan view of a rail clamping mechanism of the device of FIG. 1.

Referring now to FIG. 3, a rail clamping mechanism 20 is shown in greater detail. Specifically, a support 100 sits on top of one of the flanges of railroad rail 21. A fixed clamping leg 35 is secured via support 100 to clamping cylinder 25, and has a free end which abuts against railroad rail 21. Clamping cylinder 25 is secured to support 100 and has a movable piston 102 therein, as is conventional, which is connected with a clamping hinge 32. The free end of clamping hinge 32 is pivotally connected with a pivoting leg 33 which has a clamping foot 34 at the free end thereof which clamps onto the side of railroad rail 21 opposite to fixed clamping leg 35. Accordingly, when the piston 102 is retracted, as is well known, clamping foot 34 is moved away from railroad rail 21, and when extended, is moved into contact with railroad rail 21.

Figure 4:
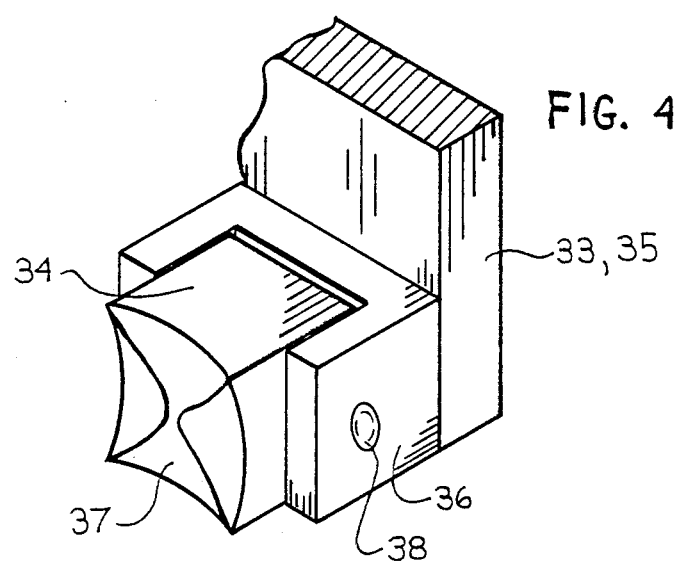
FIG. 4 is a perspective view of the clamping foot assembly of the rail clamping mechanism of FIG. 3.

As shown is FIG. 4, fixed clamping leg 35 and pivoting leg 33 each has a pivotal foot holder 36 secured to the free end thereof, with a clamping foot 34 pivotally secured in pivotal foot holder 36 by means of a pivot pin 38. Each clamping foot 34 has an exposed concave pivot foot face 37 which is highlighted by four equally spaced corner points. Each clamping foot 34 is made of hardened tool steel, and because of the unique shape of pivot foot face 37, can adapt to any known railroad rail web configuration. Thus, due to the four point configuration and pivoting construction, clamping feet 34 are able to firmly hold onto all different configured railroad rail webs. Further, it is important that clamping occur on the web portion of the railroad rail, since this is the only section of the rail which is of sufficient uniformity, as to allow one system to clamp all rail sizes. In the event of greater web thickness, variation in depth and the like, the length of the pivoting feet can be changed.

Thus, the device according to the present invention is designed to cut an I-beam like configuration of a railroad rail, I-beams generally, conveyor beams and other similarly configured structures. A typical working environment includes the I-beam railroad rail, or such, acting as a machine frame so as to reduce the weight and increase the portability of the device. The drive section is separated from the cutting or sawing section by an easily detachable torque conveyance device, so that two lightweight sections are formed, thereby allowing easy and simple operation by one man, as well as the easy movement of two light sections by one man. Because of the considerable weight of a railroad rail, it is more desirable in the plant, or in the field, to move a lightweight machine to the job, than to move a heavy rail to a machine. In the field, the rail is often secured to cement or wood ties, and in such instances, only a portable machine can be utilized to cut the rail. A true cut is of great importance, particularly as the rail is to be welded. An important aspect of this invention is to guarantee a true and accurate cut at an exact 90 degree angle to the rail every time. Further, because the rail is clamped on both sides of the cut, it will be burr free.

Thus, the present invention provides a device for the cutting of railroad rails in place, in the field or in the shop. It can also be used with a rail that is stacked randomly, without mounting the rail to a vice. It is also adaptable to all rail sizes, and can also be utilized for the sawing (cutting) of composite third rails made of aluminum and steel. The device is designed to have a minimum of weight and bulk, by means of the separation of the sawing and driving sections, and by means of the railroad rail to be cut as an integral frame support member for the entire cutting apparatus. The shaft that connects the drive and cutting portion of the device can easily be separated and re-assembled by the operator at his convenience. Due to the elimination of the machine frame and the separation of the sawing and driving sections, two lightweight components easily transportable by one man, make the device portable, which portability is of great value due to the weight of the rail.

The device according to the present invention utilizes the rail to be cut as the frame, not only because the rail, due to its cross-sectional design, is very sturdy, but also because the torque development through the cutting process can be absorbed by it without the use of a cumbersome and heavy integral machine frame.

Although a preferred embodiment of the invention has been described herein, many variations to the various components of the invention may be made. For example, the drive shaft of FIG. 5 could be replaced by a flexible shaft which is currently sold under the Trademark "Suhner". Also, a variation of the vertical feeding elements 15 and 31 is possible, by utilizing machine slides, or further, accumulator 29 could be replaced by a spring or gravity feed.

Having described a specific preferred embodiment of the invention with reference to the accompanying drawings, it will be appreciated that the present invention is not limited to that precise embodiment, and that various changes and modifications may be effected therein by one of ordinary skill in the art without departing from the scope or spirit of the invention as defined in the appended claims.

What is claimed is:

1. A railroad rail cold sawing device for securement about a railroad rail having a central web and flanges connected to opposite ends of the web, said device comprising:

a circular sawing section having a cold circular saw blade positioned above said rail;
   a motor drive section;
   first clamping means for removably clamping said sawing section to said central web of said railroad rail, regardless of any curvature in the central web;
   second clamping means for removably clamping said drive section to said central web adjacent to said circular sawing section, regardless of any curvature in the central web; and
   connection means removably connecting said drive section and said sawing section for causing rotation of said cold circular saw blade, said connection means including at least one joint means for permitting relative movement of said circular sawing section with respect to said drive section in at least a plane parallel to said web.

2. A railroad rail cold sawing device according to claim 1, wherein said connection means includes a female shaft connected with one of said sawing section and said drive section; and a male shaft connected with the other of said sawing section and said drive section and telescopically receivable within said female shaft to removably connect said drive section and said sawing section for causing rotation of said saw blade.

3. A railroad rail cold sawing device for securement about a railroad rail having a central web and flanges connected to opposite ends of the web, said device comprising:
   (a) a circular sawing section having a cold circular saw blade;
   (b) a drive section;
   (c) connection means removably connecting said drive section and said sawing section for causing rotation of said cold circular saw blade; and
   (d) clamping means for removably clamping said sawing section and said drive section to said central web of said railroad rail, said clamping means including:
      (i) support means for supporting a respective section on an upper one of said flanges;
      (ii) fixed clamping leg means fixedly secured to said support means for clamping one side of said central web;
      (iii) pivotal clamping elbow means pivotally secured to said support means for clamping an opposite side of said central web;
      (iv) drive means connected to said support means and said pivoting clamping leg means for pivoting said pivoting clamping leg means into clamping relation with the opposite side of said central web to secure the respective section to the railroad rail, said drive means including:
         (A) piston-cylinder means for pivoting said clamping elbow means into clamping relation with the opposite side of said central web to secure the respective section to the railroad rail, said piston-cylinder means including a substantially vertically movable piston; and
         (B) clamping hinge means for connecting said piston to said pivotal clamping elbow means;
         (C) wherein movement of said piston in one direction causes said pivoting clamping elbow means to clamp onto the opposite side of said central web, and movement of the piston in the opposite direction causes said pivotal clamping elbow means to unclamp from the opposite side of said central web;
      (v) clamping foot means secured to the free end of said pivotal clamping elbow means for clamping onto the opposite side of said central web, said clamping foot means having an exposed concave pivot foot face which is highlighted by four equally spaced corner points for firmly clamping onto the opposite side of said central web, said exposed concave pivot foot face having concave peripheral edges defined between each of said corner points; and
      (vi) pivotal foot holder means secured to the free end of said pivotal clamping elbow means for pivotally securing said clamping foot means to the free end of said pivotal clamping elbow means.

4. A clamping assembly for clamping a railroad rail cold sawing device about a railroad rail having a central web and flanges connected to opposite ends of the web, said clamping assembly comprising:

support means for supporting a respective section of the device on an upper one of said flanges;

fixed clamping leg means fixedly secured to said support means for clamping one side of said central web;

pivotal clamping leg means pivotally secured to said support means for clamping an opposite side of said central web; and drive means connected to said support means and said pivoting clamping leg means for pivoting said pivoting clamping leg means into clamping relation with the opposite side of said central web to secure the respective section to the railroad rail;

clamping foot means secured to the free end of said pivotal clamping leg means for clamping onto the opposite side of said central web, said clamping foot means having an exposed concave pivot foot face which is highlighted by four equally spaced corner points for firmly clamping onto the opposite side of said central web, said exposed concave pivot foot face having concave peripheral edges defined between each of said corner points; and pivotal foot holder means secured to the free end of said pivotal clamping leg means for pivotally securing said clamping foot means to the free end of said pivotal clamping leg means.

5. A clamping assembly according to claim 4; wherein said fixed clamping leg means has a free end; and further including second clamping foot means secured to the free end of said fixed clamping leg means for clamping onto the one side of said central web.

6. A clamping assembly according to claim 5; further including second pivotal foot holder means secured to the free end of said fixed clamping leg means for pivotally securing said second clamping foot means to the free end of said fixed clamping leg means.

7. A clamping assembly according to claim 6; wherein said second clamping foot means has an exposed concave pivot foot face which is highlighted by four equally spaced corner points for firmly clamping onto the one side of said central web, said exposed concave pivot foot face of said second clamping foot means having concave peripheral edges defined between each of said corner points.

8. A clamping assembly for clamping a railroad rail cold sawing device about a railroad rail having a central web and horizontally oriented flanges connected to opposite ends of the web, said clamping assembly comprising:

support means for supporting a respective section of the device on an upper one of said horizontally oriented flanges;

fixed clamping leg means fixedly secured to said support means for clamping one side of said central web;

pivotal clamping elbow means pivotally secured to said support means for clamping an opposite side of said central web; and drive means connected to said support means and said pivoting clamping leg means for pivoting said pivotal clamping elbow means into clamping relation with the opposite side of said central web to secure the respective section to the railroad rail and;

said drive means includes:

piston-cylinder means for pivoting said pivotal clamping elbow means into clamping relation with the opposite side of said central web to secure the respective section to the railroad rail, said piston-cylinder means including a substantially vertically movable piston; and clamping hinge means for connecting said piston to said pivotal clamping elbow means;

wherein movement of said piston in one direction causes said pivoting clamping elbow means to clamp onto the opposite side of said central web, and movement of the piston in the opposite direction causes said pivoting clamping elbow means to unclamp from the opposite side of said central web.

* * * * *